United States Patent
Rhee et al.

(10) Patent No.: US 9,430,458 B2
(45) Date of Patent: Aug. 30, 2016

(54) LIST-BASED INTERACTIVITY FEATURES AS PART OF MODIFYING LIST DATA AND STRUCTURE

(75) Inventors: Yong Woo Rhee, Seattle, WA (US); Charles Reeves Little, II, Bellevue, WA (US); James Bentley Railton, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1143 days.

(21) Appl. No.: 13/288,111

(22) Filed: Nov. 3, 2011

(65) Prior Publication Data
US 2013/0117714 A1 May 9, 2013

(51) Int. Cl.
G06F 3/048 (2013.01)
G06F 17/24 (2006.01)

(52) U.S. Cl.
CPC .................................. *G06F 17/245* (2013.01)

(58) Field of Classification Search
None
See application file for complete search history.

(56) References Cited

U.S. PATENT DOCUMENTS

| | | | |
|---|---|---|---|
| 5,778,240 A | 7/1998 | Buchman et al. | |
| 6,469,713 B2 * | 10/2002 | Hetherington et al. | 715/740 |
| 7,587,393 B2 * | 9/2009 | Battagin et al. | |
| 7,702,997 B2 | 4/2010 | Kotler et al. | |
| 7,712,016 B2 | 5/2010 | Jones et al. | |
| 7,721,228 B2 * | 5/2010 | Burke et al. | 715/825 |
| 7,818,282 B2 * | 10/2010 | Blackwell et al. | 704/8 |
| 7,937,651 B2 | 5/2011 | Kelkar et al. | |
| 7,949,962 B1 | 5/2011 | Pham et al. | |
| 2004/0199543 A1 * | 10/2004 | Braud et al. | 707/104.1 |
| 2005/0144570 A1 * | 6/2005 | Loverin et al. | 715/822 |
| 2006/0229971 A1 * | 10/2006 | Kelly | 705/37 |
| 2008/0256454 A1 * | 10/2008 | Latzina et al. | 715/732 |
| 2009/0276692 A1 * | 11/2009 | Rosner | 715/227 |
| 2010/0031167 A1 * | 2/2010 | Roytman | 715/760 |
| 2010/0241516 A1 * | 9/2010 | Kim et al. | 705/14.73 |
| 2011/0145297 A1 * | 6/2011 | Singh | 707/802 |
| 2011/0251942 A1 * | 10/2011 | Rosenthal et al. | 705/37 |
| 2012/0017175 A1 * | 1/2012 | Duquene et al. | 715/823 |
| 2012/0023449 A1 * | 1/2012 | Zabielski | 715/825 |
| 2012/0084708 A1 * | 4/2012 | Upadhyaya et al. | 715/781 |
| 2012/0089896 A1 * | 4/2012 | Harasemchuk et al. | 715/227 |
| 2012/0089914 A1 * | 4/2012 | Holt et al. | 715/728 |
| 2012/0102432 A1 * | 4/2012 | Breedvelt-Schouten et al. | 715/823 |
| 2012/0311437 A1 * | 12/2012 | Weeldreyer et al. | 715/252 |
| 2013/0055061 A1 * | 2/2013 | Ashley-Rollman et al. | 715/228 |
| 2014/0007045 A1 * | 1/2014 | Muller | 717/107 |

OTHER PUBLICATIONS

Highlight Table Rows, Columns, and cells using MooTool1.2.3 by David Walsh Blog, published Jul. 2011, 9 pages. Internet wayback archive.*

(Continued)

*Primary Examiner* — Hien Duong
(74) *Attorney, Agent, or Firm* — Tom Wong; Julie Kane Akhter; Micky Minhas (57) ABSTRACT

Embodiments are provided that include interactive electronic list features and functionality, but are not so limited. In an embodiment, a method is configured to enable users to directly manipulate list content and/or structure in context. A system of an embodiment includes at least one client and a server system to manage aspects of electronic lists, including providing visualization features that correspond with pre-selection, post-selection, and/or editing states or inputs. Other embodiments are also disclosed.

19 Claims, 11 Drawing Sheets

(56) References Cited

OTHER PUBLICATIONS

Dragtable:Visually reorder all your table columns, by Danvk.org, Published Jun. 2011 , 7 pages. Internet wayback archive.*
"Overview of PivotTable and PivotChart Reports", Retrieved on: Aug. 31, 2011, Available at: http://office.microsoft.com/en-us/excel-help/overview-of-pivottable-and-pivotchart-reports-HP010177384.aspx.
"Editing and Validating Data in ODM Studio", Retrieved on: Aug. 31, 2011, Available at: http://publib.boulder.ibm.com/infocenter/odmeinfo/v3r5/index.jsp?topic=%2Filog.odms.ide.odme.help%2FContent%2FOptimization%2FDocumentation%2FODME%2F_pubskel%2FODME_pubskels%2Fstartall_ODME35_Eclipse57.html.
"Editing Tabular Data in WPF—Building a WPF Grid", Retrieved on: Aug. 31, 2011, Available at: http://blogs.msdn.com/b/bethmassi/archive/2008/09/15/editing-tabular-data-in-wpf-building-a-wpf-grid.aspx.

* cited by examiner

| | CONTOSO | MAIL | LYNC | SITE | | WELCOME ARMANDO |
|---|---|---|---|---|---|---|

‹‹ LEVEL UP ▹ LEVEL UP ▹

DOCUMENTS

ALL ITEMS ▽  — 406

CLICK TO STOP EDITING THIS LIST

| | TITLE | ASSIGNED TO | STATUS | FIND AN ITEM... DUE DATE |
|---|---|---|---|---|
| □ | COLLECT COST ESTIMATES FOR SUPPLIES | □ FRANK MARTINEZ | NOT STARTED | 10/21/2010 |
| ✎ | NEGOTIATE PRICING WITH VENDORS | □ ELLEN ADAMS | COMPLETED | 10/22/2010 |
| □ | SIGN CONTRACT | □ MARK HANSON | NOT STARTED | 10/22/2010 |
| □ | VISIT FACTORIES | □ ARMANDO PINTO | COMPLETED | 10/23/2010 |
| □ | EVALUATE SUPPLY SAMPLES | □ MARK HANSON | NOT STARTED | 10/24/2010 |
| □ | SEND PAYMENTS TO SUPPLIERS | □ ELLEN ADAMS | NOT STARTED | 10/18/2010 |
| | START TYPING TO ADD A NEW ITEM | | | |

◁ 1 - 6 ▷

SITE ☆ PAGE

SEARCH THIS SITE...

WHAT'S NEW

NOTEBOOK

DOCUMENTS — 404

TASKS — 402

ADD LINK

RECENT

APPS

FIGURE 4A

| | SITE | | CONTOSO | MAIL | LYNC | SITE | | WELCOME ARMANDO ▽ ⊙ |
|---|---|---|---|---|---|---|---|---|

400

DOCUMENTS

<< LEVEL UP ▷ LEVEL UP ▷

ALL ITEMS ▽

| | TITLE | | ASSIGNED TO | STATUS | DUE DATE |
|---|---|---|---|---|---|
| | CLICK TO STOP EDITING THIS LIST | | | FIND AN ITEM... | |
| ☐ | COLLECT COST ESTIMATES FOR SUPPLIES | | ☐ FRANK MARTINEZ | NOT STARTED | 10/21/2010 |
| ☐ | NEGOTIATE PRICING WITH VENDORS | | ☐ ELLEN ADAMS | COMPLETED | 10/22/2010 |
| ◯ | SIGN CONTRACT | | ☐ FRANK MARTINEZ | NOT STARTED | 10/22/2010 |
| ☐ | VISIT FACTORIES | | ☐ ARMANDO PINTO | NOT STARTED | 10/23/2010 |
| ☐ | EVALUATE SUPPLY SAMPLES | | ☐ MARK HANSON | COMPLETED | 10/24/2010 |
| ☐ | SEND PAYMENTS TO SUPPLIERS | | ☐ ELLEN ADAMS | NOT STARTED | 10/18/2010 |
| | START TYPING TO ADD A NEW ITEM | | | | |

408 — (SIGN CONTRACT row)
412 — (VISIT FACTORIES row)
414 — ASSIGNED TO
410 — (below table)

◁ 1 - 6 ▷

SITE 🔖 PAGE
SEARCH THIS SITE...
WHAT'S NEW
NOTEBOOK
DOCUMENTS
TASKS
ADD LINK
RECENT
APPS

FIGURE 4B

| | TITLE | | ASSIGNED TO | STATUS | DUE DATE |
|---|---|---|---|---|---|
| ☐ | COLLECT COST ESTIMATES FOR SUPPLIES | ☐ | FRANK MARTINEZ | NOT STARTED | 10/21/2010 |
| ☐ | NEGOTIATE PRICING WITH VENDORS | ☐ | ELLEN ADAMS | COMPLETED | 10/22/2010 |
| ☐ | SIGN CONTRACT | ☐ | FRANK MARTINEZ | NOT STARTED | 10/22/2010 |
| ☐ | VISIT FACTORIES | ☐ | ARMANDO PINTO | COMPLETED | 10/23/2010 |
| ☐ | EVALUATE SUPPLY SAMPLES | ☐ | MARK HANSON | NOT STARTED | |
| ☐ | SEND PAYMENTS TO SUPPLIERS | ☐ | ELLEN ADAMS | | |
| | START TYPING TO ADD A NEW ITEM | | | | |

FIGURE 4C

ALL DOCUMENTS ▽  | FIND AN ITEM... | 🔽

| ☐ TITLE | ASSIGNED TO ⇄ ▽ US | DUE DATE | + |
|---|---|---|---|
| CLICK TO ADD NEW ITEM OR EDIT THIS LIST | | | |
| ☐ COLLECT COST ESTIMATES FOR SUPPLIES 📄 | ☐ FRANK MARTINEZ | STARTED | 10/21/2010 |
| ☐ NEGOTIATE PRICING WITH VENDORS 📄 | ☐ ELLEN ADAMS | PLETED | 10/22/2010 |
| ☐ SIGN CONTRACT 📄 | ☐ FRANK MARTINEZ | STARTED | 10/22/2010 |
| ☐ VISIT FACTORIES 📄 | ☐ ARMANDO PINTO | STARTED | 10/23/2010 |
| ☐ EVALUATE SUPPLY SAMPLES 📄 | ☐ MARK HANSON | PLETED | 10/24/2010 |
| ☐ SEND PAYMENTS TO SUPPLIERS 📄 | ☐ ELLEN ADAMS | STARTED | 10/18/2010 |

FIGURE 4D

ALL DOCUMENTS

☐ TITLE | STATUS | ASSIGNED TO | DUE DATE
---|---|---|---
COLLECT COST ESTIMATES FOR SUPPLIES | NOT | ☐ FRANK MARTINEZ | 10/21/2010
NEGOTIATE PRICING WITH VENDORS | COM | ☐ ELLEN ADAMS | 10/22/2010
SIGN CONTRACT | NOT | ☐ FRANK MARTINEZ | 10/22/2010
VISIT FACTORIES | NOT | ☐ ARMANDO PINTO | 10/23/2010
EVALUATE SUPPLY SAMPLES | COM | ☐ MARK HANSON | 10/24/2010
SEND PAYMENTS TO SUPPLIERS | NOT | ☐ ELLEN ADAMS | 10/18/2010

FIGURE 4E

| ☐ TITLE | STATUS | ASSIGNED TO ▽ | DUE DATE |
|---|---|---|---|
| CLICK TO ADD NEW ITEM OR EDIT THIS LIST | | | |
| ☐ COLLECT COST ESTIMATES FOR SUPPLIES | NOT STARTED | ☐ FRANK MARTINEZ | 10/21/2010 |
| ☐ NEGOTIATE PRICING WITH VENDORS | COMPLETED | ☐ ELLEN ADAMS | 10/22/2010 |
| ☐ SIGN CONTRACT | NOT STARTED | ☐ FRANK MARTINEZ | 10/22/2010 |
| ☐ VISIT FACTORIES | NOT STARTED | ☐ ARMANDO PINTO | 10/23/2010 |
| ☐ EVALUATE SUPPLY SAMPLES | COMPLETED | ☐ MARK HANSON | 10/24/2010 |
| ☐ SEND PAYMENTS TO SUPPLIERS | NOT STARTED | ☐ ELLEN ADAMS | 10/18/2010 |

LIST-BASED INTERACTIVITY FEATURES AS PART OF MODIFYING LIST DATA AND STRUCTURE

BACKGROUND

Collaboration or content management systems provide a natural place to share ideas and information due in part to access and management abilities offered to multiple users, rich customization options, and a lightweight collaborative environment. For example, a shared list can be created and shared by enterprise users of a collaboration system when collaborating on some idea or process. Interactive list-based functionality of current systems requires users to open separate forms or settings pages in order to manipulate content and structure of tabular lists. Additional interactive steps required for end-users to manipulate list-based content and structure may result in an undesirable and discouraging user experience as users are forced into a rigid and cumbersome list interaction paradigm.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided that include interactive electronic list features and functionality, but are not so limited. In an embodiment, a method is configured to enable users to directly manipulate list content and/or structure in context. A system of an embodiment includes at least one client and a server system to manage aspects of electronic lists, including providing visualization features that correspond with pre-selection, post-selection, and/or editing states or inputs. Other embodiments are also disclosed.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
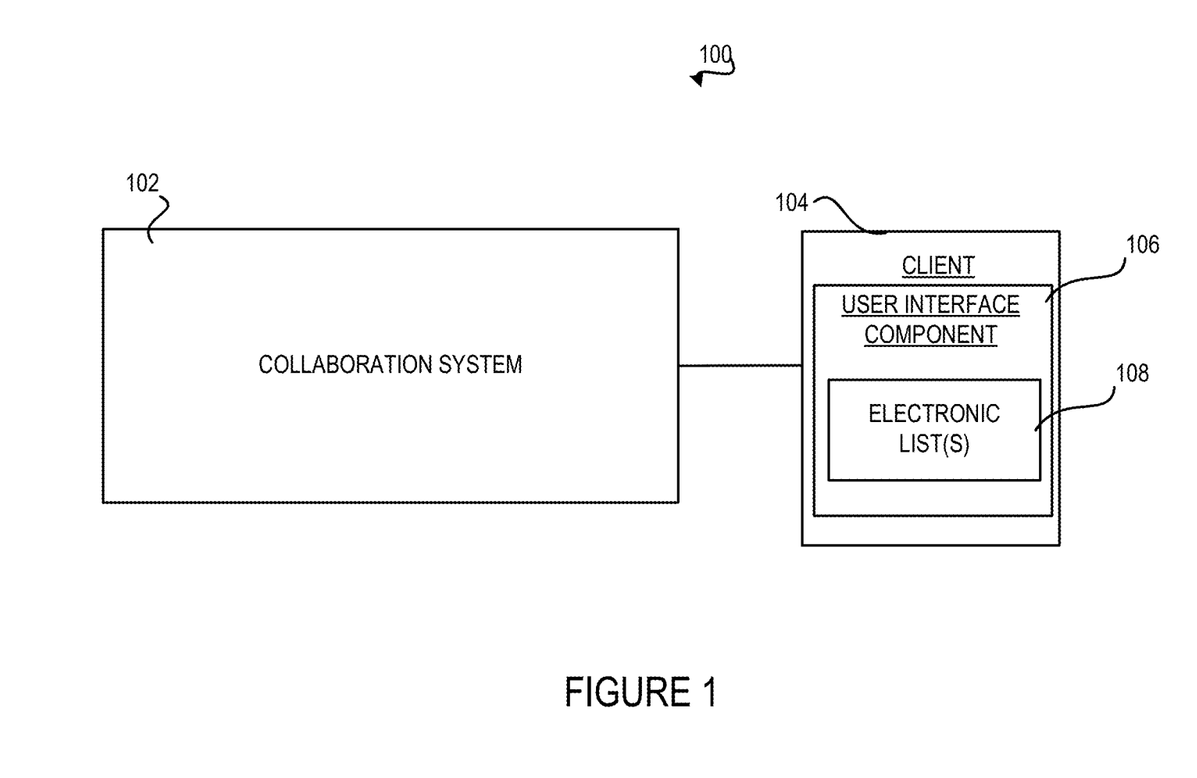
FIG. 1 is a block diagram of an exemplary computing environment.

FIG. 1 is a block diagram of an exemplary computing environment 100 that includes processing, memory, networking, and/or other components that provide electronic list-based interactivity features and functionality, but is not so limited. As shown in FIG. 1, the exemplary computing environment 100 includes a content management or collaboration system 102 and at least one client 104, but is not so limited. Those skilled in the art will recognize that a plurality of client devices/systems can be configured to communicate and/or interact with the collaboration system 102 using available wireless and/or wired infrastructure and components.

The collaboration system 102 of an embodiment includes one or more servers (e.g., web server, collaboration server, database server, etc.) that provide list management, control, and communication features, including functionality to manage list updates based on user changes to aspects of an electronic list, such as content and other edits. The client 104 can communicate with the collaboration system 102 in part to enable a user to interact with and/or edit aspects of an electronic list-based data structure absent requiring the user to open separate forms, settings pages, or perform other extraneous steps. Components of the environment 100 enable manipulation of list content and/or structure by allowing a user to edit each piece of information in context and thereby filling a gap between list viewing and editing states. In an embodiment, the client 104 includes a user interface (UI) component 106 that enables a user to interact with and access one or more services of a server, including retrieving electronic list item structure and/or population information. In one embodiment, the UI component 106 is configured to use editable data information embedded in the electronic list application structure and client-side code to render visual cues or feedback associated with editable and other aspects of an electronic list.

For example, the UI component 106 can be configured as a browser-type interface to enable users to access and interact with site pages that include electronic list data structures having editable data types (see examples of FIGS. 3A-3F and FIGS. 4A-4F). As an example, the environment 100 can be implemented using one or more networked server and client machines to provide interactive site features as part of providing electronic list management and visualization functionality which includes the use of a number of visual and/or other feedback, cues, or other list visualizations determined in part by an input state or states.

In an embodiment, pre-selection, pre-edit, and/or edit input states are used in part to determine a type of visual feedback provided to a user interacting with aspects of an electronic list. As described below, interactive list actions (e.g., user input operation(s)) can be used to drive the UI component 106 as part of presenting informative visual feedback and/or other cues associated with user interactions with an electronic list. As an example, the client 104 can be configured to consume electronic pages from a networked server system and use the UI component 106 as part of providing streamlined and visually informative editing and/or other list-based actions absent requiring a user to open a settings page, template, or use some other impediment that precludes direct editing.

The collaboration system 102 can include functionality to provide collaboration services to associated users, including electronic list maintenance and access features and functionality. The UI component 106 of an embodiment includes a list interaction component configured in part as encoded program instructions that operate to control animation and/or highlight visualizations in part by using hover inputs relative to portions of an electronic list display. The UI component 106 of one embodiment displays one or more visualizations in response to a first hover input to animate a row of the electronic list and a second hover input to animate a cell of a selected row of the electronic list, and use a selection input to provide an edit state of a selected cell to enable user edits of cell content absent having to open another application, form, settings page, etc.

As shown the exemplary environment 100 of FIG. 1, the UI component 106 is used in conjunction with an electronic list 108, aspects of which can be maintained in part using functionality of the collaboration system 102. For example, the collaboration system 102 can be used to maintain and/or provide access to encoded pages that include an electronic list structure and/or content data structures. In an embodiment, the collaboration system 102 can use a number of schema representations to persist a physical list layout along with content data to be populated in the various list item cells.

Various embodiments provide electronic list viewing and interactive functionality, wherein users can readily enter a list editing state without deviating from the same structure and layout and having to perform a double operation (e.g., double click, double tap, etc.) During a pre-edit state and before entering an editing state or edit state, encoded program instructions enable users to view each piece of content in an electronic list that are highlighted individually while hovering to indicate that users can edit the information directly without having to open or use a separate form-like UI. Once in the edit state, users can readily edit other pieces of content displayed in part using a grid structure and contextual highlighting and/or animation operations that readily identify a row, column, and other aspects of an editable cell of the electronic list. Users can create new content, restructure the format (e.g., ordering of columns), add rows/columns, and/or sort and filter list content.

As an example, when a user hovers over a list item, two different highlights can be used, including a first highlight to indicate which row is in focus and a second highlight to indicate a current piece of information within the row that is in focus. The second highlight indicates that the piece of information can be interacted as a separate part by clicking on the cell associated with the second highlight which results in the list switching to an editable state. An editable state of the electronic list 108 can be used to present each piece of information in a distinctive or distinguishing format to indicate that the distinguished piece of information in focus is editable by way of a single selection gesture or input. For example, a piece of content currently in focus can be shown with a cell highlight along with corresponding column and/or row portion distinguishers having the same color as the cell highlight or outline.

It will be appreciated that other user devices/systems can be included that couple, communicate, and/or interact with one or more components of the environment 100 as part of providing interactive features and functionality. Each server can include one or multiple physical serving machines, including co-location, remote-location, and/or distributed architectures. End-users can use different browser applications, such as those used with a smartphones, laptop computers, tablet computers, desktop computers, and/or other computer/communication interfaces to access features of the environment 100.

For example, an enterprise user can use a browser or other application to create and/or access a SHAREPOINT list of ideas by accessing a worksite using a browser-based application, including those used for desktop, laptop, tablet, and/or smartphone type devices/systems. (e.g., using a SHAREPOINT server farm for example). In an embodiment, a user can use a browser application or interface to leverage the features and functionality of the exemplary computing environment 100, including existing and/or future standards, cross-browser compatible markup, etc. Thereafter, the collaborative list data can be updated in part using the collaborative object model implemented in the environment 100 (e.g., SHAREPOINT object model). The visual list structure including the edit state grid, and/or content data structures can be stored as part of computer readable storage.

Figure 2:
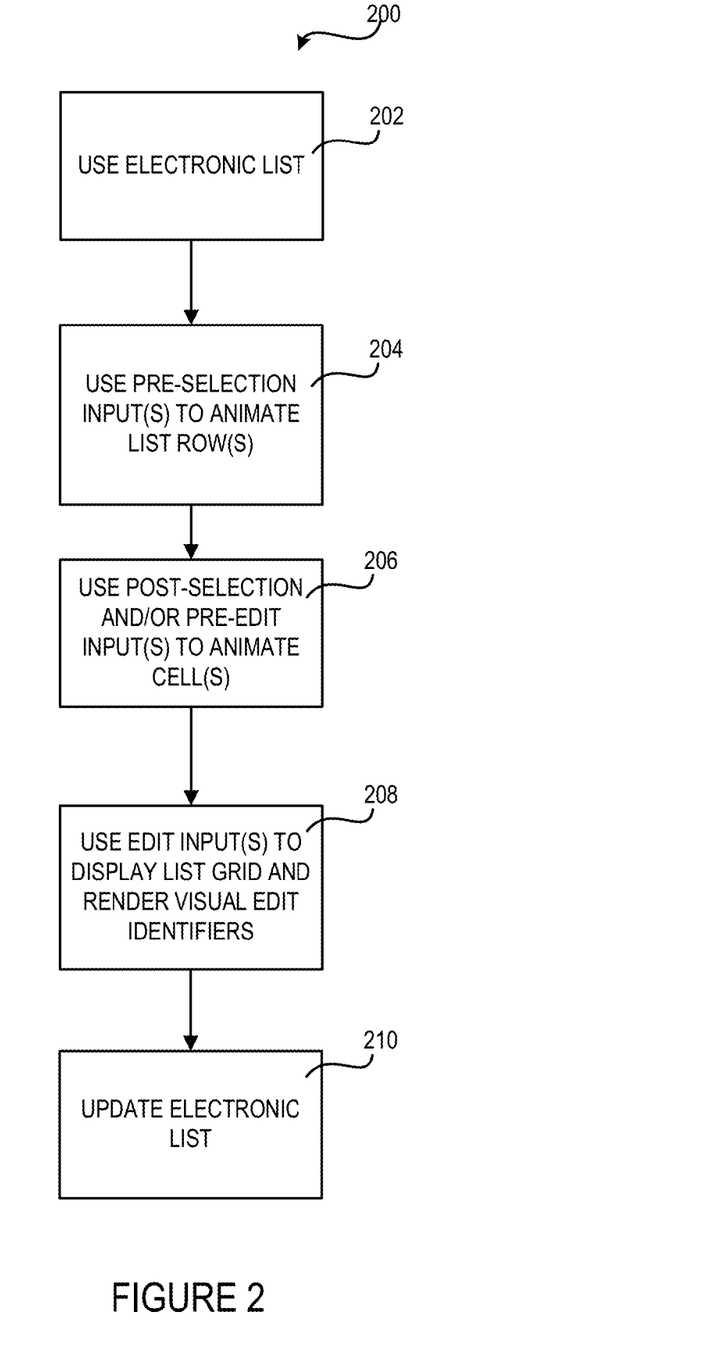
FIG. 2 is a flow diagram illustrating an exemplary process of using aspects of an electronic list.

FIG. 2 is a flow diagram illustrating an exemplary process 200 of using aspects of an electronic list, but is not so limited. In an embodiment, the process 200 can be implemented as part of providing pre-selection, pre-editing, and/or other list behaviors and states based in part a user input and/or input location (e.g., current cursor position). At 202, the process 200 begins when a user accesses and/or uses an electronic list that includes a number of list items. For example, a user can use a browser-based application to access a collaborative list from a dedicated collaboration site as part managing aspects of business venture.

At 204, once the electronic list is in use, the process 200 uses a pre-selection input to animate rows of the electronic list (e.g., as a user hovers or browses over portions of the electronic list). For example, the process 200 at 204 can operate to highlight a row directly below or coterminous with an input cursor as the user traverses over the electronic list. At 206, the process 200 uses a post-selection and/or pre-edit input to animate cells of a selected row having editable content and thereby inform the user of an editable state (e.g., as a user hovers or browses across list items of a selected row). For example, the process 200 at 206 can operate to highlight a cell with a distinct color and/or display a border or outline for a cell directly below or coterminous with an input cursor as a user moves over the row cells.

At 208, the process 200 uses an edit input (e.g., user click in a cell) to display a list grid and render a distinguishing visual cell border having a color, a distinguishing visual indicator to identify the row associated with the cell in focus (e.g., of the same color), and/or a distinguishing visual indicator to identify the column associated with the cell in focus (e.g., of the same color). At 210, the process 200 operates to update the electronic list with edited content with or without an affirmative save operation by the user. In one embodiment, content changes can be stored locally and/or remotely as part of maintaining and managing aspects of electronic lists. For example, after one or more editing operations, a client can push updated list parameters to one or more components of a content management system.

It will be appreciated that processing, networking, and/or other features can assist in providing interactive and other electronic list features and interfaces. Aspects of the process 200 can be distributed to and among other components of a computing architecture, and client, server, and other examples and embodiments are not intended to limit features described herein. While a certain number and order of operations is described for the exemplary flow of FIG. 2, it will be appreciated that other numbers and/or orders can be used according to desired implementations.

FIGS. 3A-3F depict aspects of an exemplary UI component 300 configured in part to interact with aspects of an electronic list, but is not so limited. For example, the UI 300 can be integrated with browser-based functionality to enable users to access and interact with pages that include electronic list data structures. As an illustrative example, a collaboration environment can be implemented using one or more networked server machines (e.g., MICROSOFT SHAREPOINT programs and services) configured to provide electronic list functionality that enables users to create and manage aspects of their electronic lists and/or other information. Continuing the example, the UI component 300 can be used to access electronic pages from a server machine and provide interactive content editing and other interactive list features to end-users.

Figure 3A:
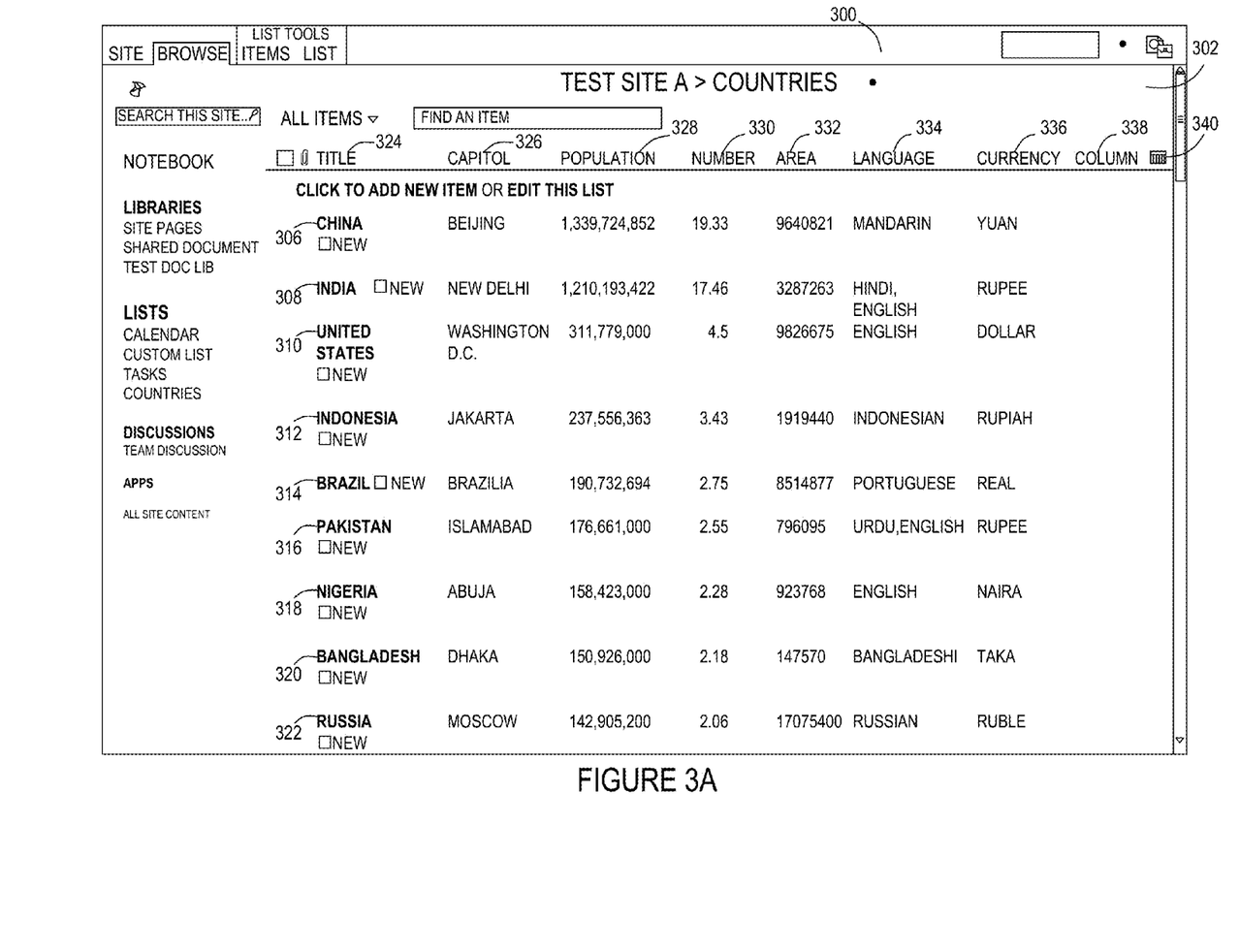
FIGS. 3A-3F depict aspects of an exemplary user interface (UI) component configured in part to interact with aspects of an electronic list.

FIG. 3A depicts the UI component 300 displaying a site page 302. As shown for this example, the user has used the UI component 300 to access an electronic list (e.g., "Countries") 304 that includes a number of list rows 306-322 and corresponding list columns 324-338. Interactive button 340 can be used to create or add a new list column having a data type for the electronic list 304 (e.g., text, number, date/time, person/group column, and/or other types).

Figure 3B:
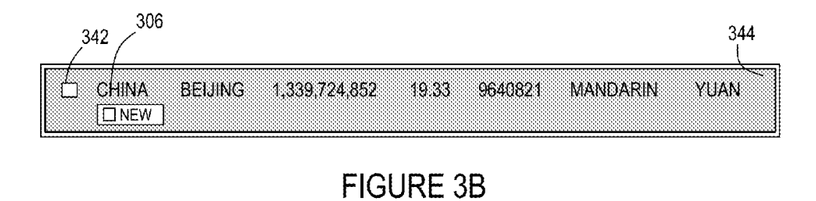

FIG. 3B zooms in on FIG. 3A and depicts a pre-selection state as a user uses an input device (e.g., touchpad, mouse, etc.) to hover (shown as a hand icon) over the electronic list 304. As shown in FIG. 3B, the UI component 300 has used encoded instructions to render a selection box 342 along with a list row animation or highlight 344 as the user hovers over the list row 306. Illustrating the process, the UI component 300 can operate to provide a selection box and highlight for each row as the user hovers over the list items. The functionality of the UI component 300 at this point in time can be defined as pre-selection behavior since a user has not currently selected a list row.

Figure 3C:
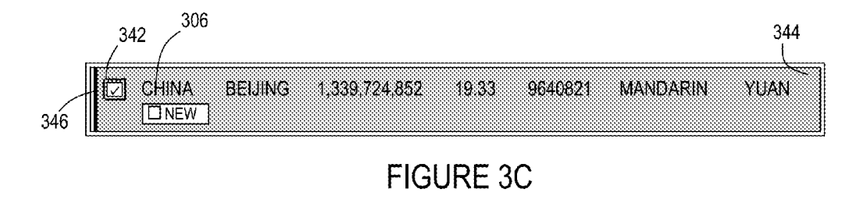

FIG. 3C shows the list row 306 after the user has interacted with selection box 342 (e.g., clicked the box) which has also triggered the UI component 300 of an embodiment to render an additional highlight, animation or other distinguishing feature 346 to distinguish the now selected row 306 as being in focus comprising a vertical pronounced line displayed at a leftmost vertical position of the selected row 306. In an alternative embodiment, editable content of list items can be directly accessed for editing, including providing visual cues to indicate edit actions of a cell currently in focus, absent requiring a user to affirmatively check a box or perform some other affirmative action.

Figure 3D:
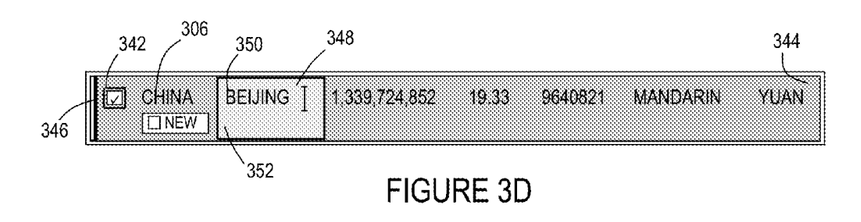

FIG. 3D depicts a post-selection and pre-edit state of the list row 306 as the user hovers over the second column 326 of the list row 306. During the post-selection and pre-edit state of the list row 306, the UI component 300 operates in part to track or detect user interactions (e.g., hover, select (e.g., click), etc.). As shown in FIG. 3D, the user hover action (shown by I-beam icon) has triggered the UI component 300 to render an additional highlight or animation 348 along with a cell outline 350 for editable cell 352 to identify editable content to inform the user. The UI component 300 operates to provide the cell highlight and outline surfacing features as the user hovers from one editable cell to another editable cell in list row 306. It will be appreciated that one or more cells can be implemented as read-only, wherein the UI component 300 can be configured to indicate un-editable content for any read-only cells.

Figure 3E:
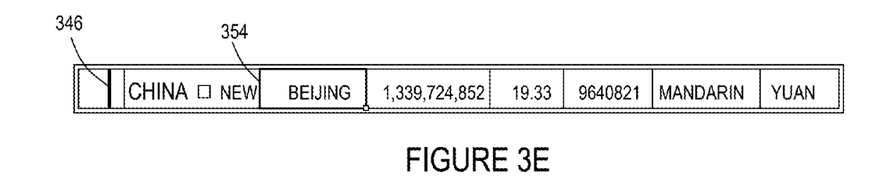

FIG. 3E depicts an edit state of editable cell 352 after a user has interacted with the cell (e.g., clicked, tapped, etc.). As shown in FIG. 3E, the user edit action (shown by the arrow icon) has caused the list to enter an editable state, wherein the UI component 300 renders the additional bold outline 354 along with cell boundary visuals (e.g., dotted cell outline for all cells) to inform the user of the edit state. In an embodiment, during an editable state, the UI component 300 is configured to present each piece of information on a light grey grid or other format to indicate that information is editable using a single selection gesture. In one embodiment, the UI component 300 is configured to present a piece of content that is currently in focus with a highlight of the associated cell as well as animating an associated column header and/or distinguishing a leftmost cell portion of the selected row.

Figure 3F:
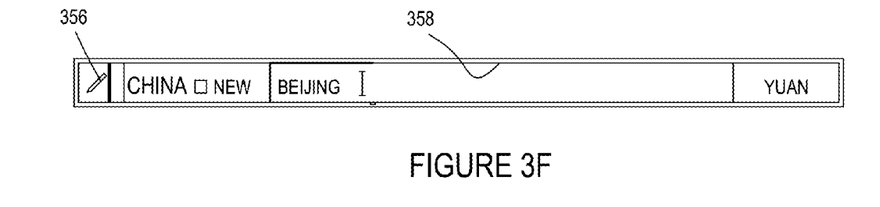

FIG. 3F depicts editing of content of editable cell 352 as indicated by a pencil icon 356 and expanded cell outline border 358.

FIGS. 4A-4F depict aspects of an exemplary UI component 400 configured in part to interact with aspects of an electronic list. For example, the UI component 400 can be included as part of a browser or other type of application to enable users to access and interact with site pages that include electronic list data structures. As an illustrative example, a computing environment can be implemented using one or more networked server and client machines to provide interactive features as part of providing electronic list management functionality including the use of a number of list visualizations provided in part based on an input state and/or location. In an embodiment, pre-selection, and/or pre-edit input states are used in part to determine a type of visual feedback provided to a user managing aspects of an electronic list. For example, the UI component 400 can be configured to access electronic pages from a networked server system and enable focused editing actions, absent requiring a user to open a settings page, template, or other additional input mechanism.

Figure 4A:
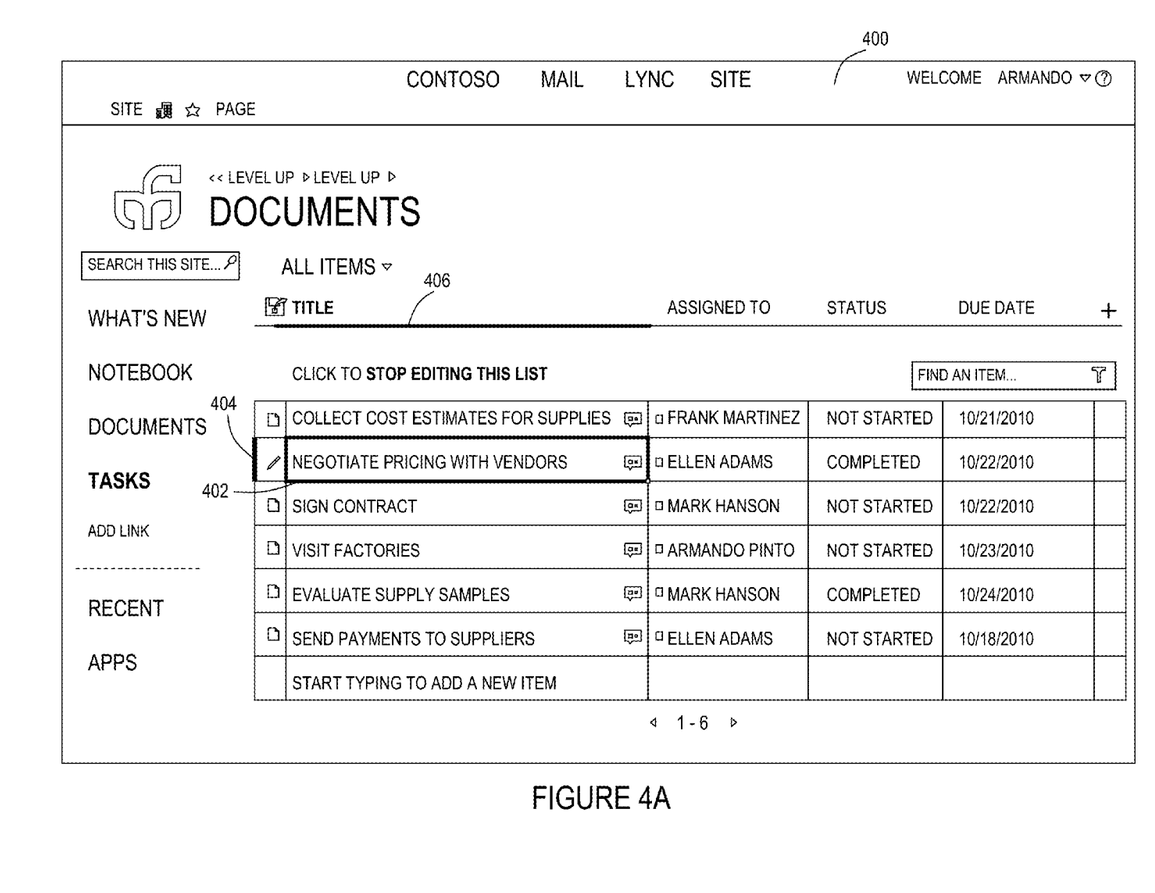
FIGS. 4A-4F depict aspects of an exemplary UI component configured in part to interact with aspects of an electronic list.

FIG. 4A depicts an edit state of the electronic list after a user has interacted with a list item (e.g., clicked on "Negotiate pricing with vendors" cell). As shown in FIG. 4A, the user edit action has caused the UI component 400 to render a distinguishing visual cell border 402 having a color, a distinguishing visual row selection indicator 404 (e.g., vertical and/or horizontal cell border(s) emphasis) of the same color and/or an edit icon indicator (a pencil icon for this example), and/or a distinguishing visual column selection indicator 406 (e.g., horizontal and/or vertical cell border(s) emphasis) of the same color along with the column name simultaneously to indicate an edit state to a user.

Figure 4B:
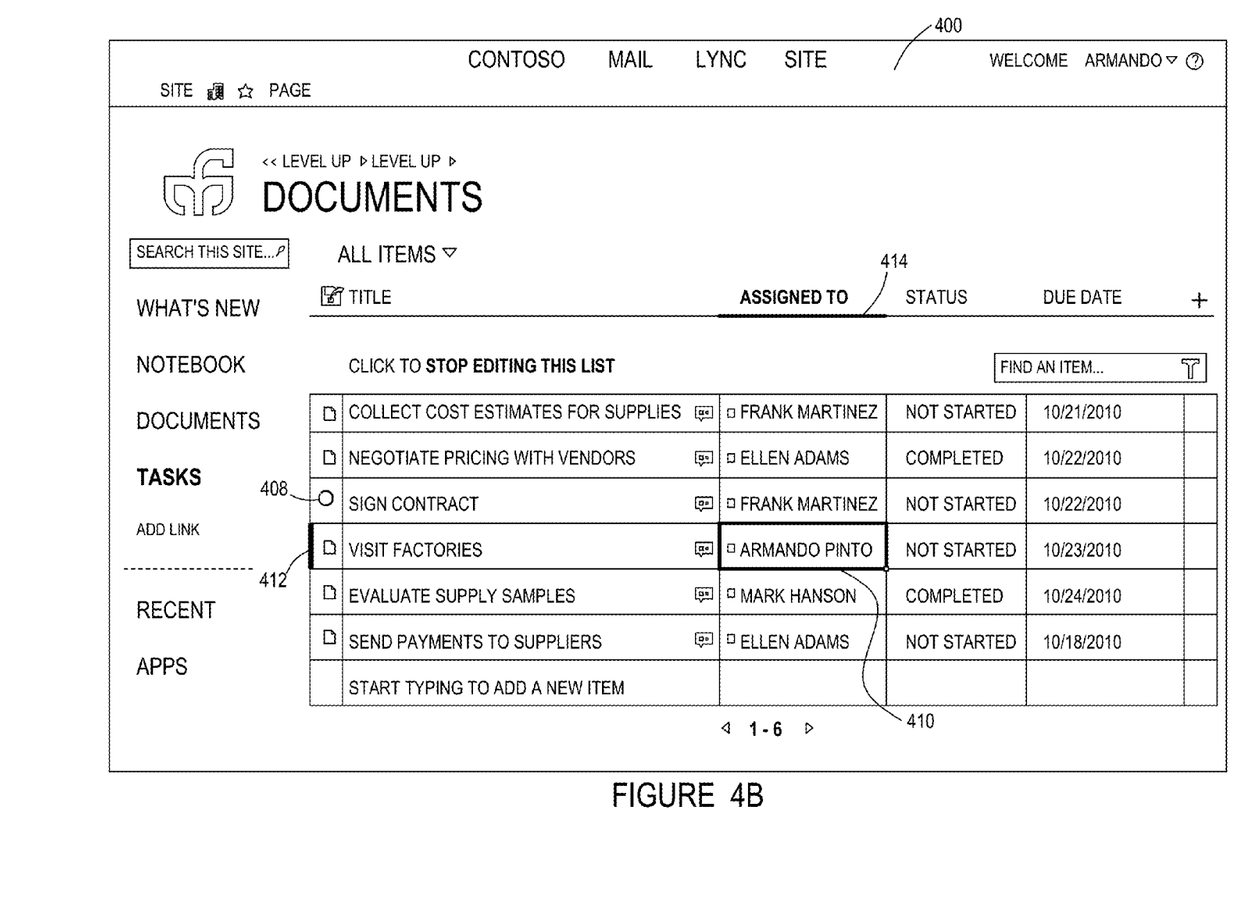

FIG. 4B depicts a long-running state of the electronic list after a user has interacted with a list item. As shown in FIG. 4B, the UI component 400 has operated to render a long-running indicator 408 (e.g., spinner icon), a distinguishing visual cell border 410 having a color, a distinguishing visual row selection indicator 412 of the same color, and/or a distinguishing visual column selection indicator 414 of the same color along with the column name simultaneously to indicate the long running operation during the edit state to a user.

Figure 4C:
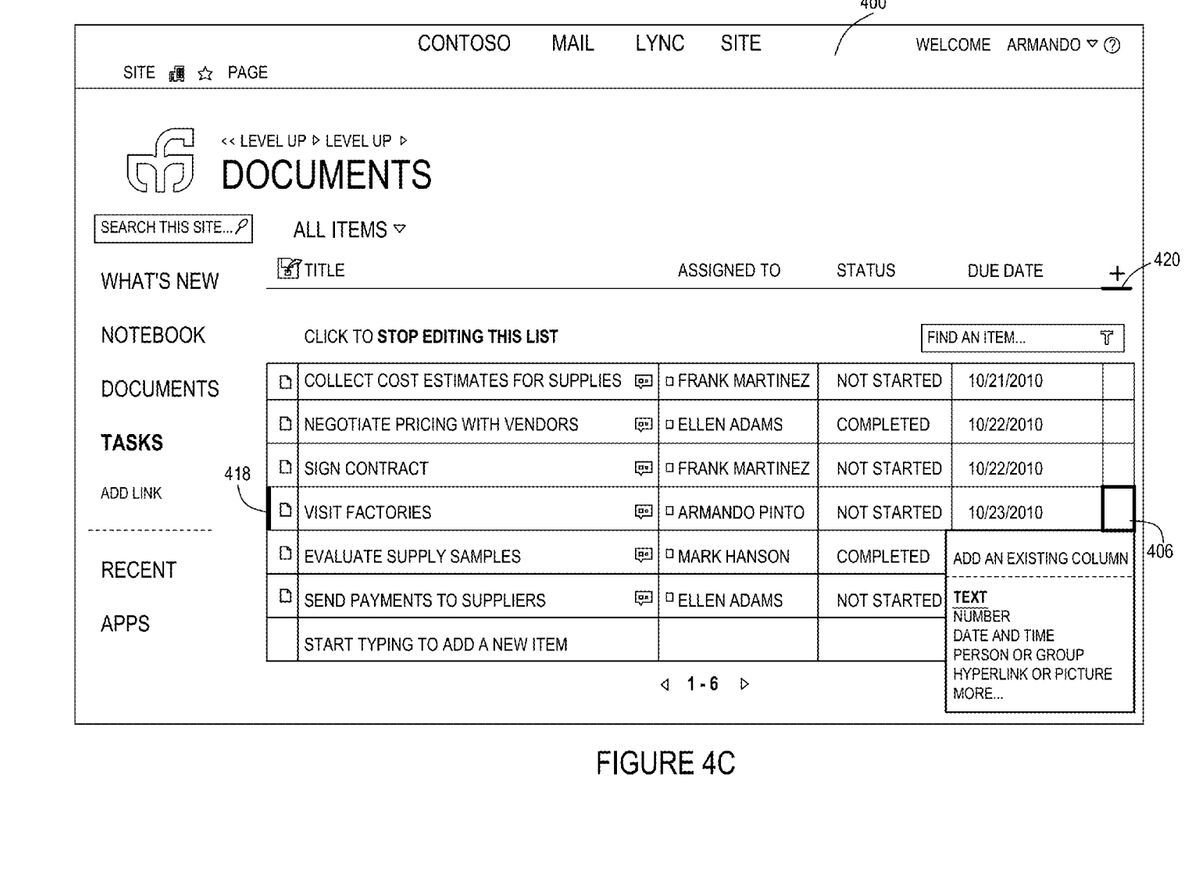

FIG. 4C depicts the UI 400 during a column addition state where a user has clicked in a cell to bring up column insertion types. As shown in FIG. 4C, the UI component 400 has operated to render a distinguishing visual cell border 416 having a color, a distinguishing visual row selection indicator 418 of the same color, and/or a distinguishing visual column selection indicator 420 of the same color simultaneously to indicate the column addition state.

Figure 4D:
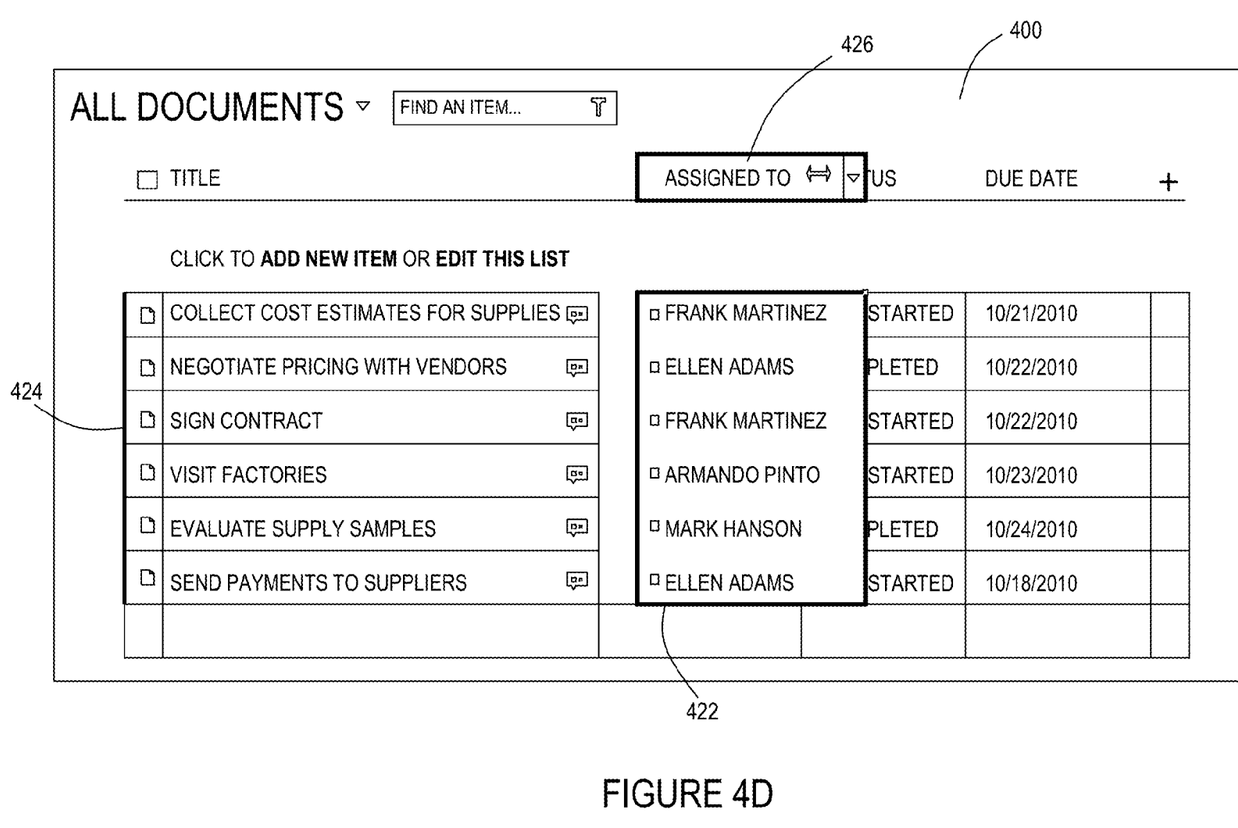
Figure 4E:
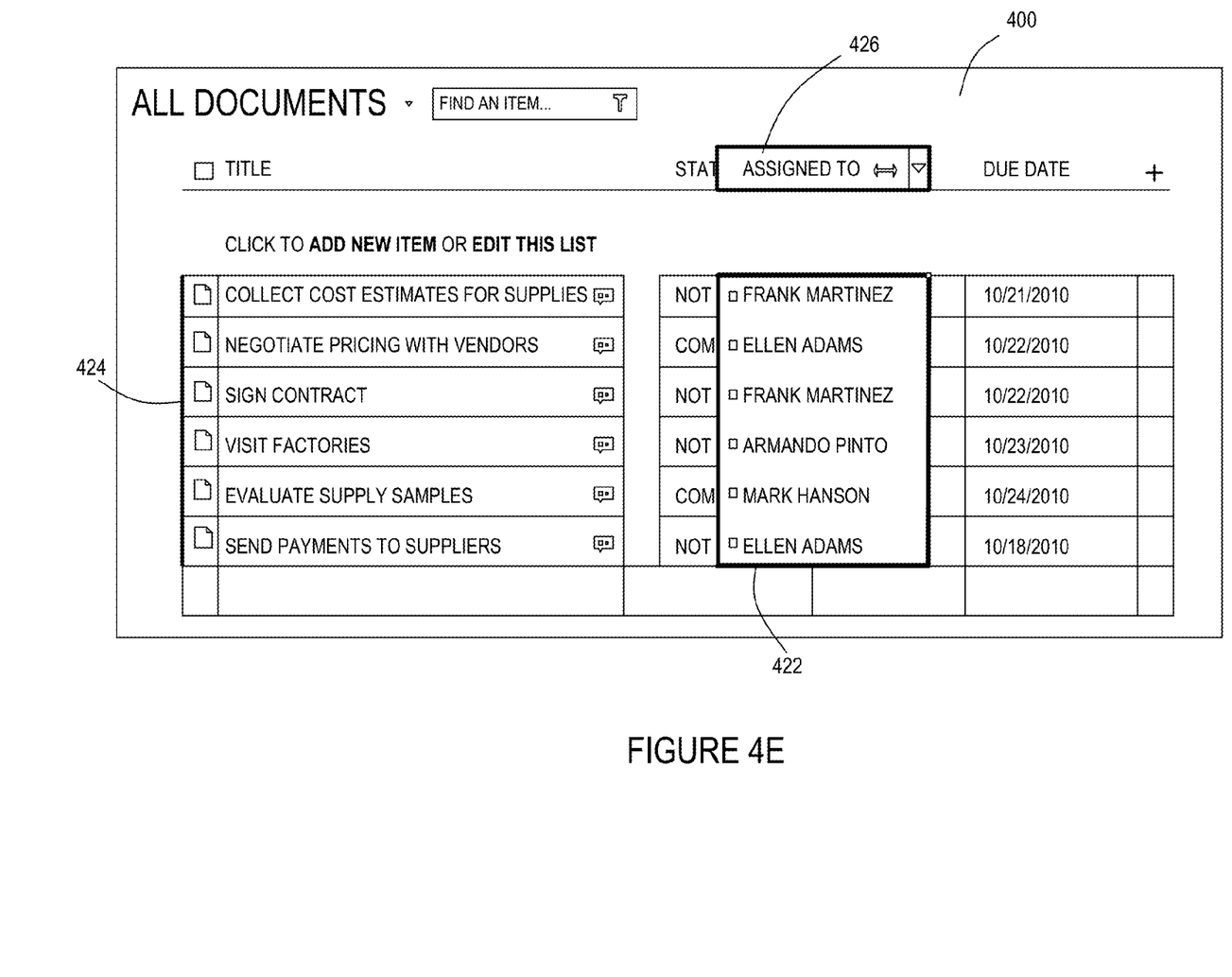
Figure 4F:
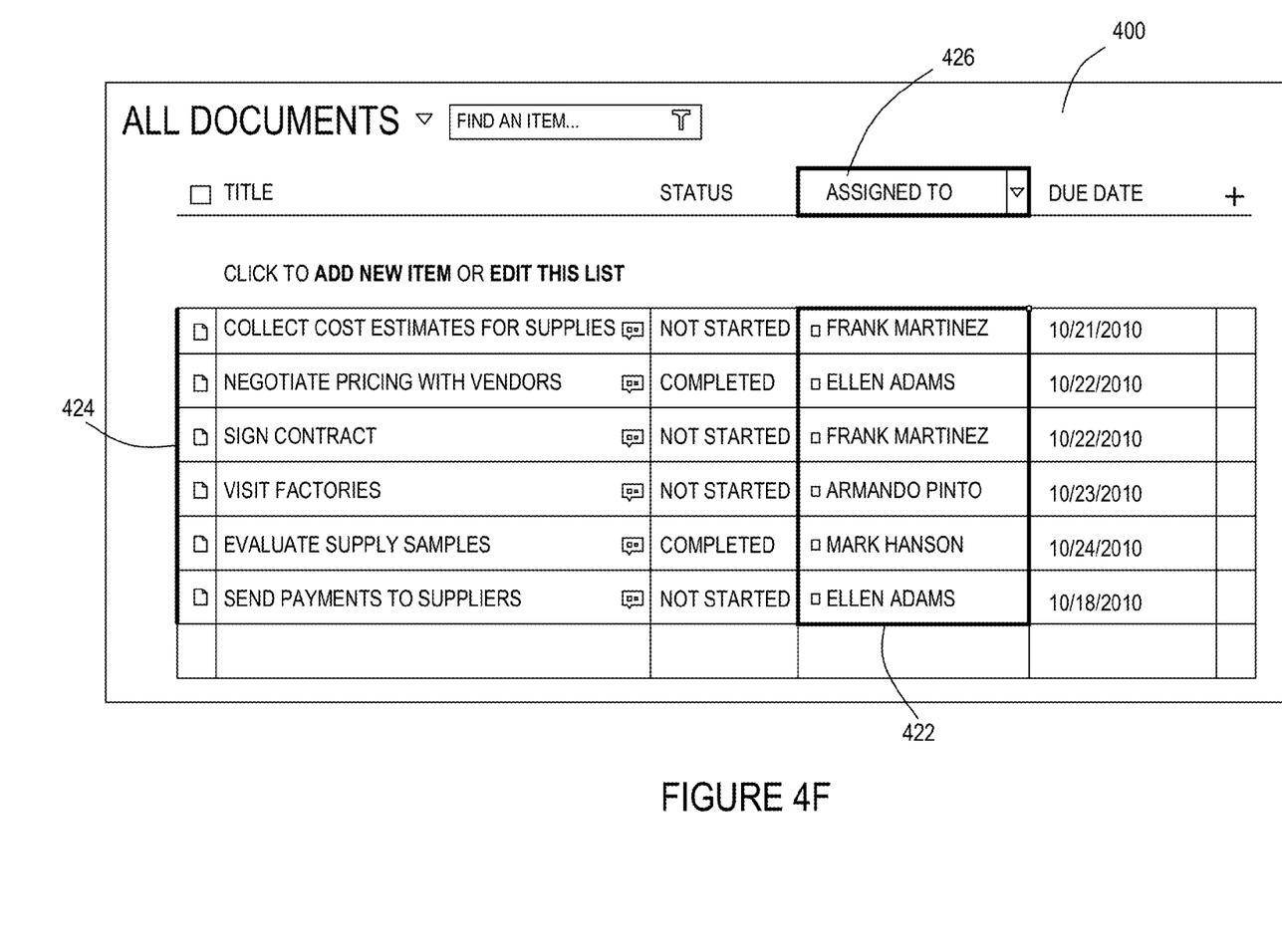

FIGS. 4D-4F depict dragging operations from a first column position to a second column position in the electronic list including visual dragging cues. As shown in FIG. 4D, the UI component 400 has operated to render a distinguishing composite visual cells border 422 having a color, a distinguishing composite visual rows selection indicator 424 of the same color, and/or a distinguishing visual column selection indicator 426 of the same color simultaneously to indicate a column dragging state. FIGS. 4E-4F depict further movement of the dragged column as it is placed in the target column location. In an embodiment, a column dragging visualization includes graphically moving a selected column to a target destination and graphically moving a column at the target destination towards an original location of the selected column to animate the dragging operation.

While certain embodiments are described herein, other embodiments are available, and the described embodiments should not be used to limit the claims. Exemplary communication environments for the various embodiments can include the use of secure networks, unsecure networks, hybrid networks, and/or some other network or combination of networks. By way of example, and not limitation, the environment can include wired media such as a wired network or direct-wired connection, and/or wireless media such as acoustic, radio frequency (RF), infrared, and/or other wired and/or wireless media and components. In addition to computing systems, devices, etc., various embodiments can be implemented as a computer process (e.g., a method), an article of manufacture, such as a computer program product or computer readable media, computer readable storage medium, and/or as part of various communication architectures.

Suitable programming means include any means for directing a computer system or device to execute steps of a method, including for example, systems comprised of processing units and arithmetic-logic circuits coupled to computer memory, which systems have the capability of storing in computer memory, which computer memory includes electronic circuits configured to store data and program instructions. An exemplary computer program product is useable with any suitable data processing system. While a certain number and types of components are described, it will be appreciated that other numbers and/or types and/or configurations can be included according to various embodiments. Accordingly, component functionality can be further divided and/or combined with other component functionalities according to desired implementations.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of device.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components include, but are not limited to, wide area networks (WANs), local area networks (LANs), metropolitan area networks (MANs), proprietary networks, backend networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions. Other embodiments and configurations are available.

Exemplary Operating Environment

Figure 5:
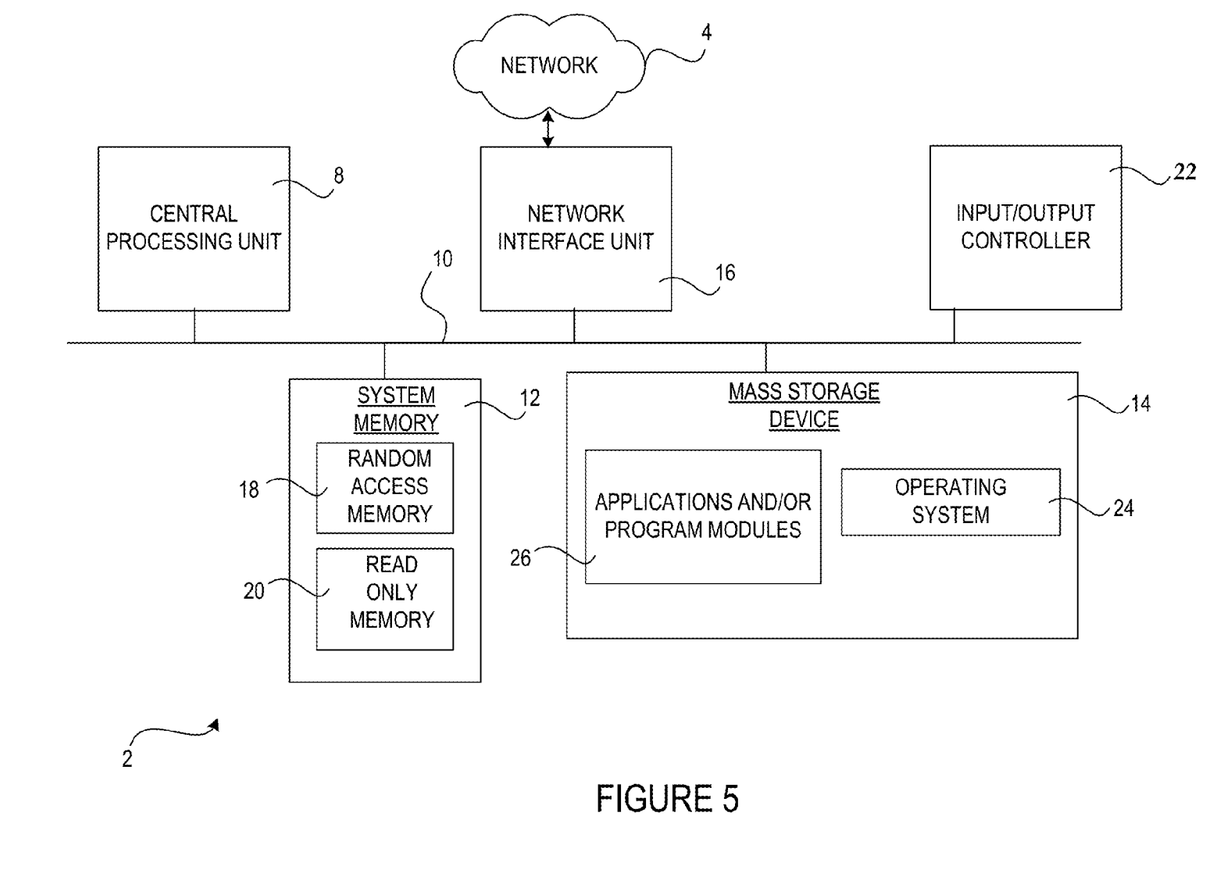
FIG. 5 is a block diagram illustrating an exemplary computing environment for implementation of various embodiments described herein.

Referring now to FIG. 5, the following discussion is intended to provide a brief, general description of a suitable computing environment in which embodiments of the invention may be implemented. While embodiments of the invention will be described in the general context of program modules that execute in conjunction with program modules that run on an operating system on a personal computer, those skilled in the art will recognize that the invention may also be implemented in combination with other types of computer systems, devices, and/or program modules.

Generally, program modules include routines, programs, components, data structures, and other types of structures that perform particular tasks or implement particular abstract data types. Moreover, those skilled in the art will appreciate that the embodiments of the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 5, an illustrative operating environment for embodiments of the invention will be described. As shown in FIG. 5, computer 2 comprises a general purpose server, desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of editing electronic list content within a collaboration system, the method comprising:
    using an electronic list including a number of list items having associated data types;
    using a pre-selection input to animate rows of the electronic list including highlighting a row of the electronic list associated with a position of an input cursor as the user navigates the electronic list;
    using a post-selection and pre-edit input to animate cells of a selected row including highlighting a cell of the selected row associated with a position of the input cursor as the user navigates the selected row;
    using an edit state to switch cell content of a selected cell to an editable state including distinguishing a column portion and a row portion associated with the selected cell to identify the edit state; and
    in response to editing the selected cell, presenting an editing indicator in a selected row portion.

2. The method of claim 1, further comprising receiving an editing input associated with the selected cell of the selected row, including highlighting cell content currently in focus, distinguishing a column header portion, and distinguishing a vertical cell portion of a leftmost cell of the selected row.

3. The method of claim 1, further comprising using a first type of highlighting to depict an editable state of the selected cell to indicate a single selection gesture.

4. The method of claim 1, further comprising dragging a selected column to reorder list columns.

5. The method of claim 4, further comprising moving the selected column in a target destination and graphically moving a column at the target destination towards an original location of the selected column as part of a dragging visualization.

6. The method of claim 1, further comprising presenting content currently in focus with a cell highlight along with distinguishing associated column header portions and a portion of a leftmost cell of the selected row.

7. The method of claim 1, further comprising accessing the electronic list using a dedicated server including maintaining electronic list updates using the dedicated server.

8. The method of claim 1, further comprising using a collaboration system to manage aspects of the electronic list based in part on user edit operations.

9. The method of claim 1, further comprising providing a column insertion action as part of providing electronic list interactivity.

10. The method of claim 1, further comprising displaying a progress indicator graphic in a cell of the selected row to indicate a long running operation.

11. The method of claim 1, further comprising providing a user interface (UI) configured in part to display visual feedback during one or more of a pre-selection operation, a post-selection operation, and an editing operation.

12. The method of claim 1, further comprising displaying the electronic list using a device display.

13. The method of claim 1, further comprising using color and border highlighting to provide list interactivity visualizations including editable content feedback.

14. A system for collaborative editing of electronic list content, the system comprising:
    a server device comprising a processor and including a number of electronic lists, each electronic list including a number of list items; and
    a client device comprising a processor and communicatively coupled to the server and including an interactive interface configured to display aspects of an electronic list, the client including encoded programming code that operates to:
        use a hover operation in conjunction with the electronic list in part to provide highlighting of list rows as part of a pre-selection operation;
        use a hover operation in conjunction with a selected row of the electronic list in part to provide highlighting of cells of the selected row as part of a post-selection and a pre-edit operation;
        use a selection action associated with a selected cell to enable direct editing of cell content and provide visual feedback indicators as part of an editing operation; and in response to editing the selected cell, present an editing indicator in a selected row portion.

15. The system of claim 14, the client further configured to use user input to edit the cell content of an editable cell.

16. The system of claim 14, the server configured in part to update aspects of the electronic list based on client communications.

17. A system for collaborative editing of electronic list content, the system comprising:
   a processor;
   a user interface, the user interface comprising:
      a display portion to display aspects of an electronic list, including a number of rows, columns, and cells; and
      a list interaction component to manage user interactions with aspects of the electronic list, the list interaction component configured to:
         use hover inputs relative to portions of the electronic list to provide one or more visualizations that include a first hover input to animate a row of the electronic list and a second hover input to animate a cell of a selected row of the electronic list;
         use a selection input to provide an edit state visualization of a selected cell and enable user edits of cell content absent additional constraints; and
         in response to editing the selected cell, present an editing indicator in a selected row portion.

18. The system of claim 17, the list interaction component further configured to present a piece of content that is currently in focus with a highlight of the associated cell as well as distinguishing an associated column header and a portion of a leftmost cell of the selected row.

19. The system of claim 17, further configured to access electronic pages from a networked server system and use the list interaction component to enable streamlined editing actions absent requiring a user to open a settings page, template, or other additional mechanism.

* * * * *